(No Model.)
J. G. SOUERS.
MOLE TRAP.
No. 275,280. Patented Apr. 3, 1883.
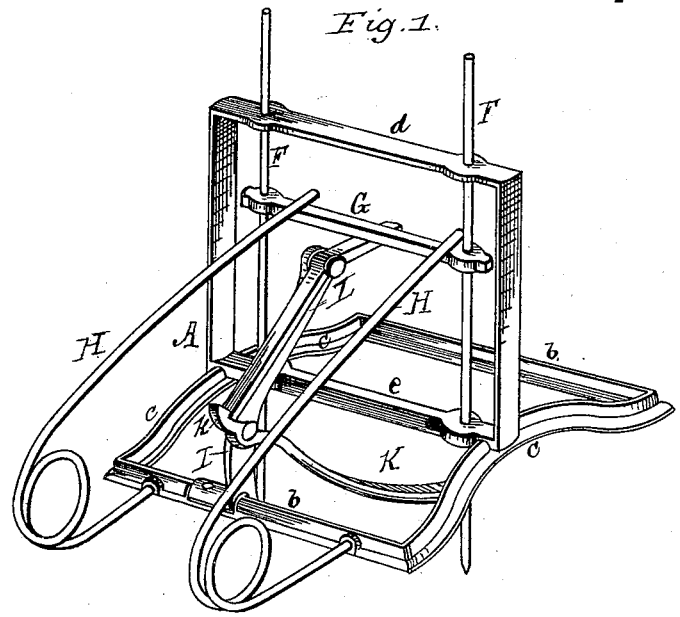
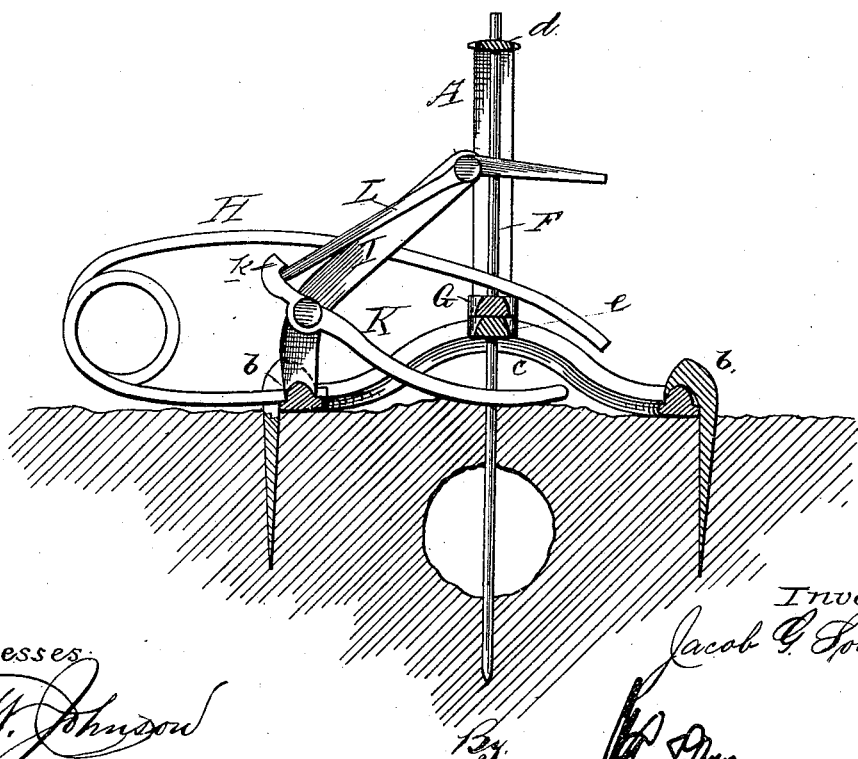
Witnesses:
C. W. Johnson
Lauurch Duvall
Inventor
Jacob G. Souers
By
Attorney

UNITED STATES PATENT OFFICE.

JACOB G. SOUERS, OF MOUNT VERNON, ILLINOIS.

MOLE-TRAP.

SPECIFICATION forming part of Letters Patent No. 275,280, dated April 3, 1883.

Application filed January 13, 1883. (No model.)

*To all whom it may concern:*

Be it known that I, JACOB G. SOUERS, a citizen of the United States of America, residing at Mount Vernon, in the county of Jefferson and State of Illinois, have invented certain new and useful Improvements in Mole-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of mole-traps which kill the animal by impalement upon spears or spikes which are driven into the mole-hill by springs.

The object of the improvement is to provide a trap of this class which shall be strong and simple in construction, and in which the impaling-spears shall be driven with great force, insuring the killing of the mole.

In the accompanying drawings, Figure 1 is a perspective view of my improved mole-trap, and Fig. 2 is a vertical section of the same between the springs, and illustrating the manner of setting the trap.

The letter A designates the supporting-frame, which is composed of the open base having ground-bars $b$ and arched end bars, $c$, which are to span the mole-path, these arched end bars being surmounted by a vertical guide-frame having a top bar, $d$, and bottom bar, $e$, provided with guide-passages for the spears F F.

G is a cross-bar connecting the spears, and firmly attached to both.

To one of the side bars, $b$, are attached the ends of powerful springs H H, which are so bent that their free ends bear upon the cross-bar G and force it downward, as shown in Fig. 2. From the ground-bar $b$, to which the springs are attached, an arm, I, projects upward from about midway between the springs and is bent inward, so that it terminates near the plane of the spears. To the arm I, at a short distance above the bar $b$, is pivoted a trip-trigger, K, having a catch, $k$, formed at the end of its outwardly-projecting short arm, while its long curved arm extends under the bottom bar, $e$, of the guide-frame when the trap is set. To the top of the arm I is pivoted a bent holding-trigger, L, the end of the long arm of which engages with the catch $k$ on the trip-trigger, and its short arm projects in the path of the cross-bar G.

In setting the trap it is placed so that the arched end bars span the mole-hill, as shown in Fig. 2, first pressing down the hill with the foot and then forcing the spears into the ground until the side bars rest firmly on opposite sides of the hill. The side bars are then to be secured in place by means of hooked spikes or pegs $p\,p$ driven into the ground, as shown. This being done, the holding-trigger is swung out of the path of the cross-bar G and said bar is raised, as shown in Fig. 1, and with it the spears, against the tension of the springs. The outer end of the holding-trigger L is then lowered and its inner end brought under the cross-bar, while the outer end is engaged with the catch on the end of the trip-trigger, which maintains it in position to hold up the cross-bar and spears, the long curved arm of the trip-trigger then extending under the bar and near the ground where the mole-hill has been flattened. The trap is now set, and when the mole attempts to retrace the furrow it has previously made it will raise the hill again at the point where it has been flattened under the trap, and as the earth rises it strikes the trip-trigger K and disengages from the holding-trigger, which then gives way and allows the cross-bar G to descend and the deadly spears to be driven down through the hill and impale the animal.

The entire frame-work of the trap is preferably made of cast or malleable iron, and the springs and spears may be made of either hard brass or steel. The other parts are also made of metal, either cast or wrought, but preferably of cast metal on account of cheapness in making large numbers.

Having now fully described my invention and the manner of using the same, I claim—

1. In a mole-trap, the combination, with the base having the arched bars $c$ and ground-bars $b$, and the guide-frame having the top and bottom bars provided with spear-guides, of the spears arranged in said guides, the cross-bar connecting said spears, the spring arranged to force said bar down, and suitable triggers for holding up said cross-bar and spears when the trap is set, substantially as described.

2. The combination, with the base constructed to span the mole-hill, of the guide-frame, the spears supported and guided by said guide-frame, the cross-bar connecting said spears, the bent springs H H, secured to one side of the base and arranged to force the cross-bar and spears downward, the arm I, projecting from the base, and the triggers pivoted to said arm and arranged to engage and support the cross-bar and spears when the trap is set, substantially as described.

In testimony whereof I affix my signature in presence of two witnesses.

JACOB G. SOUERS.

Witnesses:
W. V. B. BOGAN,
W. V. SATTERFIELD.